US009767484B2

(12) United States Patent
Murphy (10) Patent No.: US 9,767,484 B2
(45) Date of Patent: Sep. 19, 2017

(54) DEFINING RELEVANT CONTENT AREA BASED ON CATEGORY DENSITY (75) Inventor: Bruce W. Murphy, Pymont (AU)

(73) Assignee: Google Inc., Mountain View, CA (US)

(*) Notice: Subject to any disclaimer, the term of this patent is extended or adjusted under 35 U.S.C. 154(b) by 306 days.

(21) Appl. No.: 13/609,435

(22) Filed: Sep. 11, 2012

(65) Prior Publication Data
US 2014/0074820 A1 Mar. 13, 2014

(51) Int. Cl.
G06F 17/30 (2006.01)
G06Q 30/02 (2012.01)

(52) U.S. Cl.
CPC ..... *G06Q 30/0261* (2013.01); *G06Q 30/0256* (2013.01); *G06F 17/30705* (2013.01); *G06F 17/30716* (2013.01); *G06F 17/30873* (2013.01)

(58) Field of Classification Search
CPC .......... G06Q 30/0261; G06Q 30/0257; G06Q 30/0256; G06F 17/30241; G06F 17/3087; G06F 17/30873; G06F 17/30705
USPC ....................................................... 707/722
See application file for complete search history.

(56) References Cited

U.S. PATENT DOCUMENTS

| 5,395,533 | A | 3/1995 | Su et al. | |
|---|---|---|---|---|
| 6,826,559 | B1 * | 11/2004 | Ponte | G06F 17/30867 |
| 7,359,797 | B2 * | 4/2008 | Dorfman | G06F 17/30241 340/995.1 |
| 7,373,244 | B2 * | 5/2008 | Kreft | G01C 3/08 340/988 |
| 7,523,099 | B1 * | 4/2009 | Egnor et al. | |
| 7,587,276 | B2 * | 9/2009 | Gold | G01C 21/26 340/989 |
| 7,627,548 | B2 * | 12/2009 | Riley | G06F 17/30672 |

(Continued)

FOREIGN PATENT DOCUMENTS

| KR | 10-2005-0000225 | 1/2005 |
|---|---|---|
| WO | 2004/098665 | 11/2004 |
| WO | WO 2010/085791 | 7/2010 |

OTHER PUBLICATIONS

International Search Report and Written Opinion in International Application No. PCT/US2013/059199, dated Dec. 19, 2013, 10 pages.

(Continued)

*Primary Examiner* — Heather Herndon
*Assistant Examiner* — Merilyn Nguyen
(74) *Attorney, Agent, or Firm* — Fish & Richardson P.C.

(57) ABSTRACT

A method for defining a relevant area for displaying advertisements based on a category of a user search is disclosed. The method includes receiving a search request from a user; determining a business category based on the search request; determining a location associated with the search request; determining business category density information based at least on the determined business category and the location associated with the search request; determining an extent based on business category density information for the location; determining local content to provide to the user based at least in part on the determined extent, the business category, and the location; and providing for display to the user the local content, wherein the local content is provided to the user in addition to the search results. The location may be explicitly included in the search request, associated with responsive search results, or associated with the search request.

17 Claims, 5 Drawing Sheets

(56) References Cited

U.S. PATENT DOCUMENTS

| | | | |
|---|---|---|---|
| 7,884,043 B2 | 2/2011 | Lisetskiy et al. | |
| 8,015,172 B1 | 9/2011 | Cave et al. | |
| 8,037,166 B2 | 10/2011 | Seefeld et al. | |
| 8,041,568 B2* | 10/2011 | Strope | G06Q 10/103 |
| | | | 704/257 |
| 8,147,702 B2 | 4/2012 | Al-Jlil | |
| 8,255,248 B1* | 8/2012 | Del Favero | G06Q 10/101 |
| | | | 705/7.11 |
| 8,359,235 B1* | 1/2013 | Santoro | G06Q 30/02 |
| | | | 705/14.4 |
| 2004/0054691 A1* | 3/2004 | Sharma | G06F 17/30241 |
| 2005/0015307 A1* | 1/2005 | Simpson | G06F 17/30241 |
| | | | 705/26.61 |
| 2005/0216547 A1 | 9/2005 | Foltz-Smith et al. | |
| 2007/0061363 A1 | 3/2007 | Ramer et al. | |
| 2007/0100802 A1* | 5/2007 | Celik | G06F 17/30386 |
| 2007/0130026 A1* | 6/2007 | O'Pray | G06Q 30/02 |
| | | | 705/14.69 |
| 2008/0091412 A1* | 4/2008 | Strope | G10L 15/26 |
| | | | 704/10 |
| 2008/0201302 A1 | 8/2008 | Kimchi et al. | |
| 2008/0256044 A1* | 10/2008 | Anderson | G06F 17/3087 |
| 2008/0313142 A1* | 12/2008 | Wang et al. | 707/3 |
| 2009/0106681 A1 | 4/2009 | Gupta et al. | |
| 2009/0138445 A1* | 5/2009 | White | G06Q 30/02 |
| 2009/0265340 A1* | 10/2009 | Barcklay et al. | 707/5 |
| 2010/0320153 A1 | 12/2010 | Cousins et al. | |
| 2011/0313657 A1 | 12/2011 | Myllymaki et al. | |
| 2012/0117007 A1 | 5/2012 | Agrawal et al. | |
| 2012/0158705 A1* | 6/2012 | Konig | G06F 17/30265 |
| | | | 707/723 |
| 2013/0073388 A1* | 3/2013 | Heath | 705/14.53 |
| 2014/0358971 A1* | 12/2014 | Aminzade | G06F 17/3064 |
| | | | 707/780 |

OTHER PUBLICATIONS

Australian Office Action in Australian Application No. 2013254964, dated Dec. 5, 2013, 4 pages.
ip.com Search Report dated Nov. 14, 2011, 12 pages.
International Preliminary Report on Patentability in International Application No. PCT/US2013/059199, mailed Mar. 26, 2015, 6 pages.
Extended European Search Report issued in European Application No. 13838014.2 on Aug. 4, 2015, 7 pages.

* cited by examiner

DEFINING RELEVANT CONTENT AREA BASED ON CATEGORY DENSITY

TECHNICAL FIELD

The present specification relates to information presentation.

BACKGROUND

The Internet provides access to a wide variety of resources. Access to these resources presents opportunities for other content (e.g., advertisements) to be provided while providing the resources. For example, when a person performs an online search, content for businesses relating to the online search can also be provided to the user. Because the content is for businesses relating to the person's search, the person will presumably be interested in the content.

Selection and presentation of content can affect a user's level of interest. If content is selected at random, a user will most likely be less interested than if content is selected for a particular user. A user's online search activity may provide some insight relating to the user's interests.

SUMMARY

This document discusses systems and techniques for defining relevant areas for business entities that have campaigns relating to a user's search query. If the user's search query relates to a particular business or category of business, the user may also be interested in content from other businesses in the same business category that are easily accessible by the user. Businesses that are located close to the user, or a user's intended destination, are likely more accessible than businesses located far from the user.

Determining an appropriate size of a geographic area that is relevant to a person's search can be made part of the content selection process. In some implementations, the area a person may find relevant depends on the type of business searched. That is, if a person is searching for a very specialized business providing hard-to-find goods, the person may be more responsive to content that is associated with a large geographic area and more likely to be willing to travel farther distances to obtain the hard-to-find goods. This would result in an overall large "relevance area," or geographic area that a user would consider to be relevant to his or her search. However, if a person is searching for something more commonplace, he is likely only to consider businesses in close proximity to his current location, resulting in a smaller relevance area.

The size of the geographic area a person would find relevant may also depend on the location associated with a user submitting a search query. That is, if a user is located in a densely populated area and has many nearby options (e.g., within 1-5 miles of his location), he may be less likely to be willing to travel outside a 5 mile radius to obtain goods or services he can obtain closer to his location. A user in a pedestrian-friendly location may also be more willing to travel by foot than by car, resulting in a smaller relevance area.

The shape of the geographic area a person would find relevant may also depend on the location of the user. For example, if a user is located in a densely populated and highly developed urban area, he may be willing to travel in any direction to try a new Italian restaurant. However, a user located in a more rural setting may be limited by access to major roads and highways. As a result, the geographic area that would be considered relevant to a user located in a rural location may be affected by the accessibility of the terrain.

Described in more detail below are techniques by which an area that is relevant to a user's general search query may be defined and used for providing search results to a user. In general, innovative aspects of the subject matter described in this disclosure may be embodied in methods that include the action of receiving, using one or more computing devices, a search request from a user. The process further includes determining, using the one or more computing devices, a business category based on the search request; determining, using the one or more computing devices, a location associated with the search request, wherein the location is selected from the group comprising an explicit location included in the search request, a location associated with results responsive to the search request, and a location of interest associated with the search request; and determining, using the one or more computing devices, business category density information based at least in part on the determined business category and the location associated with the search request. The process also includes determining, using the one or more computing devices, an extent based on business category density information for the location; determining, using the one or more computing devices, local content to provide to the user based at least in part on the determined extent, the business category, and the location; and providing for display to the user, using the one or more computing devices, the local content, wherein the local content is provided to the user in addition to the search results.

These and other implementations may each optionally include the following features. For instance, determining a business category may be based on a result associated with the search request. In some implementations, determining a business category includes receiving search results to the search request and evaluating the search results to identify the business category. The search request may include a business category or a specific business belonging to a business category. In some implementations, the extent defines a relevance area that the user would consider as being relevant to the search request. In some implementations, the relevance area differs by one or more of business category or region. In some implementations, the relevance area is dependent on a population density associated with the location.

In some implementations, the process further includes providing, using the one or more computing devices, a global directory of businesses, each business being characterized as being associated with a business category, and wherein determining a business category includes using the global directory of businesses. In some implementations, determining the business category density information includes querying the global directory of businesses.

In some implementations, the process further includes providing, using the one or more computing devices, a map of business density globally by business category. In some implementations, the process further includes pre-computing, using the one or more computing devices, the map of business density. In some implementations, the extent defines an area from the location that is to be used as a criteria for selecting content. In some implementations, the extent defines a non-circular region that includes a point of origin associated with the location.

In some implementations, determining the extent includes identifying a threshold number of search request results to be returned to the user, identifying an extent that likely will include the threshold number of search request results, and querying a database of business entities to locate entities relating to the business category that are within the extent. In some implementations, determining the extent further includes determining the number of entities relating to the business category that are within the extent, and when the number of entities relating to the business category that are within the extent is greater than threshold number, modifying the extent to narrow the number of business entities to be equal to the threshold number In some implementations, the threshold number of search request results is a maximum number of results that are desired to be returned. In some implementations, determining the extent further includes identifying a minimum number of search request results and modifying the extent to expand the number of business entities in the query results to be equal to the minimum number. In some implementations, the process further includes conducting, using the one or more computing devices, an auction based on the query results associated with the extent and wherein providing content is based at least in part on results of the auction.

The systems and techniques described here may, in certain implementations, provide one or more advantages. For example, by using a location associated with a particular search query, the systems and techniques described here may yield search results specific to the location. The search results may include businesses located within an area that is determined to be relevant to the user who submitted the search. The size of the area that is determined to be relevant to the user may vary based on the particular location. For example, if a user is located in a rural area, the user may be more willing to travel farther distances than a user who is in a densely populated urban area. Additionally, the location may also affect the search results depending on the search query itself. For example, if a user is searching for a very specialized item, the user is likely to be willing to travel farther than a user looking to find a very common item.

The details of one or more embodiments are set forth in the accompanying drawings and the description below. Other features and advantages will be apparent from the description and drawings, and from the claims.

DESCRIPTION OF DRAWINGS

Like reference numbers and designations in the various drawings indicate like elements.

DETAILED DESCRIPTION

This document describes systems and techniques for defining an area that is relevant to a user's general search query. For example, a user's search query may relate to a particular business or category of business. If the user is interested in a particular business or category of business, the user may also be interested in content relating to the particular business or category of business. However, the geographic area in which the user may find such businesses to be relevant may depend on the business or category of business. This geographic area is referred to herein as the "relevance area" or "geographic relevance area."

For example, if a person is looking for pizza in Manhattan, he/she would be extremely unlikely to consider an advertisement for a pizza parlor in New Jersey to be relevant. However, if someone is looking for an expensive fountain pen or specialized sporting equipment (that has only one, a handful, or no outlets in Manhattan), he/she would be willing to travel a longer distance to buy goods or services and therefore may consider content from a larger geographic area to be meaningful.

Using information relating to the business type or category of business can allow a serving system to present content to which a user will be most receptive and that a user will deem most meaningful. In this way, the content and the businesses associated with the content will likely be the most successful at bringing in customers. By determining the business type or business category relating to a user search query, a relevance area may be determined so that only content associated with the relevance area are presented to the user.

For situations in which the systems discussed here collect personal information (e.g., query history) about users, the users may be given notice and/or consent may be obtained. In addition, certain data may be anonymized in one or more ways before it is stored or used, so that personally identifiable information is removed, such as by anonymizing user identities and aggregating user data (e.g., based on user demographics). Moreover, where an application logs user input such as queries, the input may be deleted after a predetermined time period.

Figure 1:
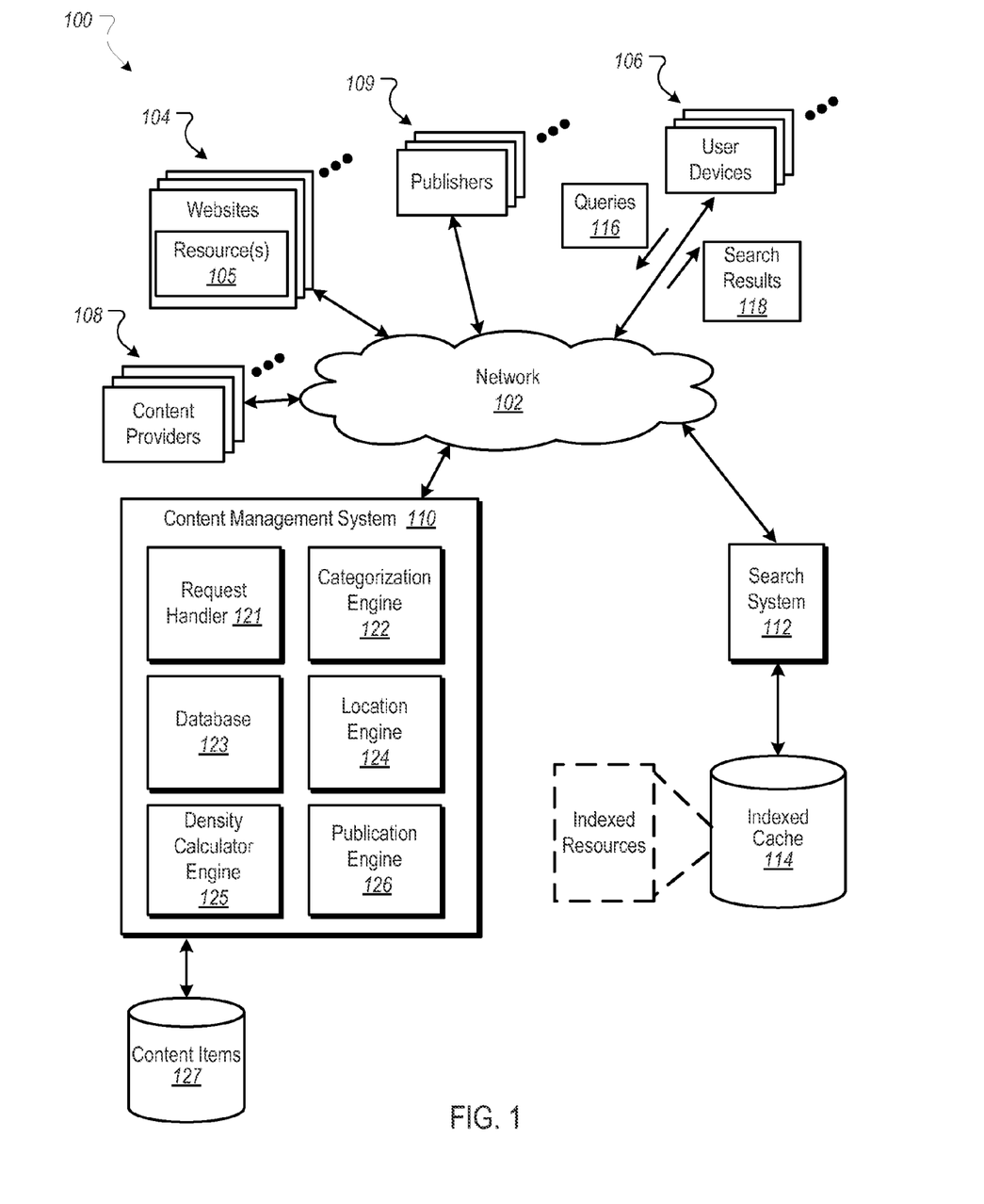
FIG. 1 is a block diagram of an example environment for defining relevant content based on business density.

FIG. 1 is a block diagram of an example environment 100 for presenting content responsive to a user search query. The example environment 100 includes a network 102, such as a local area network (LAN), wide area network (WAN), the Internet, or a combination thereof. The network 102 connects websites 104, user devices 106, content providers 108 (e.g., resource sponsors), publishers 109, and the content management system 110. The example environment may include many thousands of websites 104, user devices 106, content providers 108, and publishers 109. Content providers 108, as referred to herein, include any individual or business entity that supplies content or content items (e.g., advertisements) to be published on a website.

A website includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include web pages, HTML pages, word processing documents, portable document format (PDF) documents, images, video, and news feed sources, to name only a few. The resources can include content, such as words, phrases, images and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser to facilitate the sending and receiving of data over the network 102.

A user device can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of resources 105, the environment 100 can include a search system 112 that identifies the resources by crawling and indexing the resources provided by the content publishers on the websites 104. Data about the resources can be indexed based on the resources to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search result pages. A search result 118 is data generated by the search system 112 that identifies a resource that is responsive to a particular search query and includes a link to the resource.

The content management system 110 can select and provide additional content items to be presented in addition to search results 118 responsive to search queries 116. In some embodiments, the content management system 110 provides one or more content items automatically in response to a user search query 116. The content management system 110 receives a search request and determines a business type based on the search request. In some implementations, the search request is a user search query 116 that is sent over the network 102 to the content management system 110. The search request may be sent directly from a user device 106 over the network 102 or from the search system 112. In some implementations, the search request includes both the search query 116 and the search results 118. In some implementations, the search query 116 and search results 118 may be sent from the search system 112 to the content management system 110. The content management system 110 then analyzes the search request and provides content items based on a business type associated with the search request, as described below.

Based on the received search request, the content management system 110 determines a business category associated with the search request. For example, a search request that includes the term "pizza" may result in a business category "pizza restaurants" or "Italian restaurants." In another example, a search request for "running shoes" may result in a business category "running stores" or "athletic footwear."

The content management system 110 is further configured to determine a location associated with the search request. The location may be directly submitted by the user (e.g., by submitting his or her city or zip code) or ascertained indirectly (e.g., by obtaining an IP address associated with the user and determining a location associated with the IP address). The location may be selected from an explicit location included in the search request, a location associated with results responsive to the search request, or a location of interest associated with the search request The content management system 110 then determines business category density information for the business category at the location and determines an extent based on the business category density information for the location.

The content management system 110 can include a plurality of engines for processing, categorizing, selecting, and publishing content items. A request handler 121 receives search requests over the network 102 from the search system 112. In some embodiments, the request handler 121 receives the search requests over the network directly from a user device 106. The search requests may comprise of one or more of a search query 116 and/or search results 118, which are responsive to the search query 116. In some implementations, the search request may be derived from one or more of search queries 116 and search results 118.

A categorization engine 122 determines a business category associated with a search request. For example, if the request handler 121 receives a search request containing the word "pizza," the categorization engine 122 may determine a business category associated with the request, such as "pizza restaurant" or "Italian restaurant."

The categorization engine 122 may also access a global directory of businesses stored in a database 123. The global directory of businesses includes numerous content providers 108 (e.g., businesses). The categorization engine 122 may categorize content providers 108 in the global directory of businesses into business categories. In some implementations, the content providers 108 are already associated with one or more business categories so the categorization engine 122 does not need to make any associations. Instead, the categorization engine 122 uses the global directory of businesses to determine a business category. Categorization can be made based on market, customer, product, service, or other factors.

Information relating to each of the content providers 108 can be stored in a database 123 in or associated with the content management system 110. In some implementations, content providers 108 are already categorized into business categories, which are saved or otherwise indicated in the database 123. In some instances, a particular content provider 108 may be associated with more than one business category. Where a content provider is associated with more than one business category, a subset of the categories may be selected based on, for example, other terms in the query request. The information stored in the database 123 can include the name of the content provider 108, one or more business categories associated with the content provider 108, and the geographic location of the content provider 108.

A location engine 124 is provided for determining a location associated with a search request. In some implementations, a user may actively submit his or her location with a search query 116, which is then associated with a search request received by the content management system 110 (e.g., by providing the location data or providing location data in the search request (e.g., "pizza parlors in South Bend"). In some implementations, the location engine 124 can determine location by determining an IP address associated with a search request. Based on the determined IP address, the location engine 124 determines a location associated with the request. In some implementations, the location engine may prompt the user, the user device submitting the search query 116, or the search system 112, for the user's location. The location may be a zip code, a city, or GPS coordinates associated with the user.

As described above, the location may be an explicitly stated location in the search request (e.g., "Art Brown International Pen Store in Manhattan"). Alternatively, the location may be associated with results responsive to the search request. For example, if the search request includes the terms "Art Brown International Pen Store," results responsive to that search request may indicate that the Art Brown International Pen Store is located in Midtown Manhattan. The location may also be determined by a location of interest associated with the search request. For example, a search request that includes the term "Epcot" may be associated with the Walt Disney World Resort. The location engine 124 may determine that Walt Disney World Resort is located in Orlando, Fla., and thereby determine a location of Orlando, Fla.

The content management system 110 also includes a density calculator engine 125 for determining business category density information for the location. Business category density information is used to determine how large of a geographical area is needed to yield a certain number of meaningful results or content providers in a particular business category. A business category density indicates how many businesses in the business category are located in a particular geographic area. The more businesses are located in that particular geographic area, the higher the business density.

In some implementations, the density calculator engine 125 may determine the business category density for the location by querying the global directory of businesses stored in the database 123. By querying the global directory of businesses, the density calculator engine 125 can identify all of the businesses in the particular business category and determine the locations of each of the businesses.

In some instances, the business category density is dependent on a population density associated with the location. For example, if the business category is "pizza restaurants," a highly populated location, such as Midtown Manhattan, would have a much higher business category density than Browning, Mont. That is, a small geographic area location will likely yield many pizza restaurants in Midtown Manhattan, while a much larger geographic area surrounding a location in Browning, Mont., would be needed to yield the same number of pizza restaurants.

Other factors may affect the business category density of a particular location. For example, characteristics of a location could affect the business category density for business categories. That is, the business category density for "surf shops" would likely be higher in Honolulu, Hi., than in Tempe, Ariz.

In some implementations, the density calculator engine 125 may determine that the number of businesses in a geographic relevance area is too low and that if the relevance area was further expanded, it would likely include businesses that a user would deem too far to travel. In this case, the categorization engine 122 may provide a broader business category so as to include more possible related businesses. For example, if a search request included the term "pizza" and the categorization engine 122 initially selected the business category "pizza restaurants," the categorization engine 122 could change the business category to a broader business category, such as "Italian restaurants" to yield a greater number of relevant businesses.

Similarly, if the density calculator engine 125 determines that the number of businesses in a geographic relevance area is too high, the categorization engine 122 may provide a more narrow business category so as to include only businesses directly relating to the search request. For example, if a search request included the term "fine Italian restaurants" and the categorization engine 122 initially selected the business category "Italian restaurants," the categorization engine 122 could change the business category to a narrower business category, such as "Italian restaurants—fine dining" to yield a smaller number of businesses that are more closely related to the initial search request.

In some implementations, the density calculator engine 125 generates a map showing the business category density of content providers 108 in one or more areas. The map may be provided to a user device 106 or other component in the system 100. In some implementations, the density calculator engine 125 can generate a map of business density globally by business category.

Figure 2A:
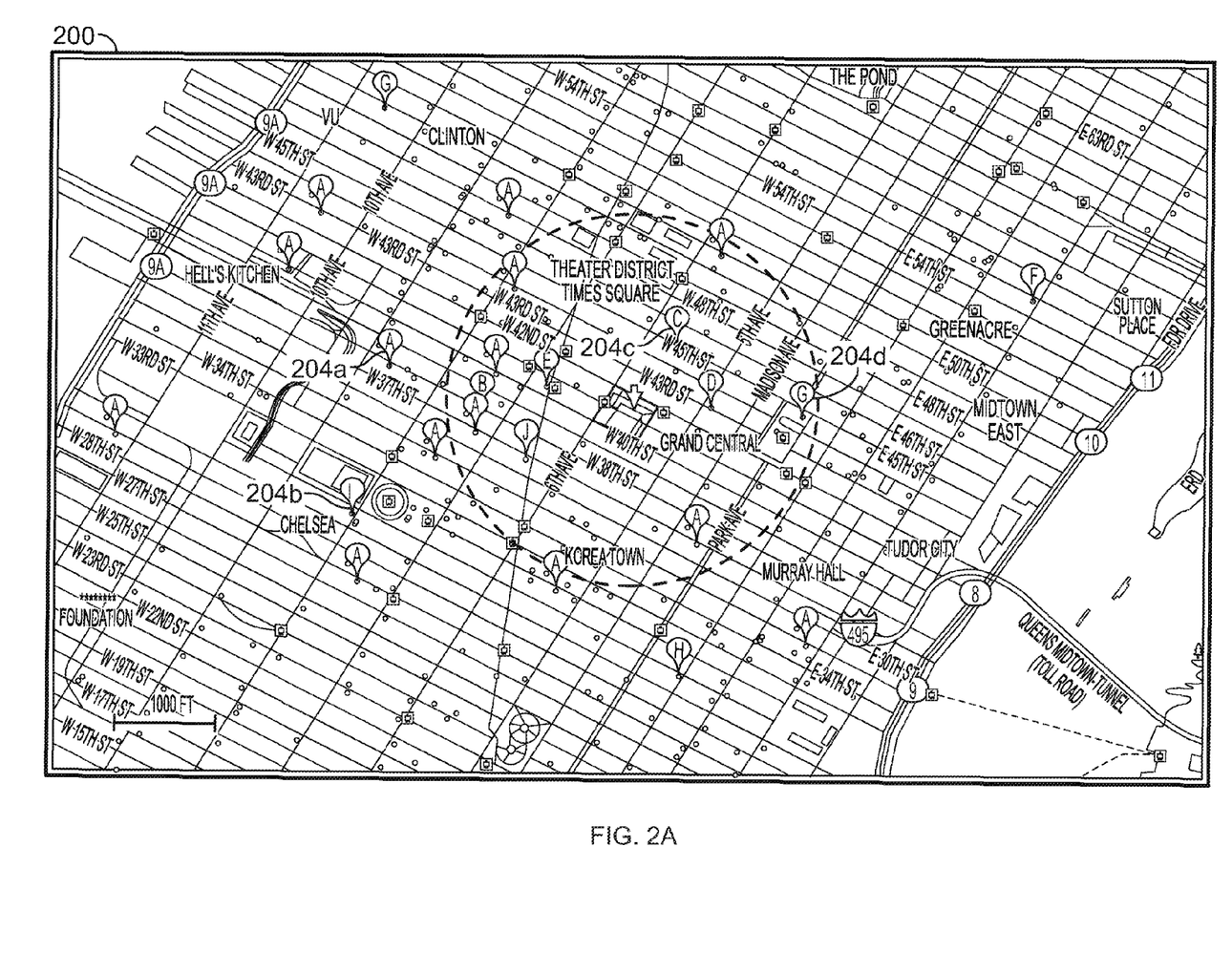
FIG. 2A is an example map showing a geographic relevance area in an area with a high business category density.

FIG. 2A shows an example map 200 of an area around Bryant Park in Midtown Manhattan. The particular location associated with a search request is indicated by the arrow 202. In some implementations, the density calculator engine 125 uses a map having markers 204*a*, 204*b*, 204*c*, 204*d* at the geographic locations of each content provider 108. The density calculator engine 125 can limit the content providers 108 to only those in the category associated with the search request (e.g., pizza restaurants). The density calculator engine 125 can further focus in on the specific location 202 associated with the request (e.g., Midtown Manhattan or Browning, Mont.) and provide a map of an area surrounding the specific location 202 with the locations of the surrounding content providers 108 in the business category indicated by the markers 204*a*, 204*b*, 204*c*, 204*d*. The more markers 204*a*, 204*b*, 204*c*, 204*d* (and thus, content providers 108 of the business category) in a particular area, the higher the business category density. Similarly, the fewer the markers, the lower the business category density.

In some implementations, the density calculator engine 125 does not use a map but instead determines where content providers in the business category are located in (or are associated with) the location or an area surrounding the location (i.e., the GPS coordinates of nearby content providers in the business category). A nearby content provider is a content provider that has content that may be selected for inclusion along with the search results where the content provider, or sponsor thereof, has a physical presence or an affiliate at or in proximity to the location.

Based on the business density information for the particular location, the density calculator engine 125 then determines an "extent" for the search request. As used herein, the term "extent" encompasses its plain and ordinary meaning, include, but not limited to an area from the location that is to be used as a criteria for selecting content to be provided to a user, a threshold number of content items to be included in the search results, and/or the like. In some implementations, determining the extent includes identifying a threshold number of content items to be returned to the user, identifying an extent that likely will include the threshold number of content items, and querying a database of business entities to locate business entities offerings (e.g., campaign content) relating to the category that are within the extent.

In some implementations, determining the extent further includes evaluating the initial eligible content items that are identified. If the total number of initial eligible content items from businesses exceeds a threshold number, the extent is modified to narrow the number of business entities to be equal to or less than the threshold number. The threshold number may be a maximum number of content items (i.e., associated with the business entities) that are desired to be returned. In some implementations, determining the extent further includes identifying a minimum number and modifying the extent to expand the number of business entities to be equal to or greater than the minimum number. In some implementations, an auction is then conducted based on the resultant business entities associated with the extent. The content management system 110 then provides content to the user based at least in part on the auction results.

In some implementations, the extent is a geographic extent defined by a radius extending from the location 202 associated with the search request so that a circular area 206 surrounding the location 202 is defined, as shown, for example, in FIG. 2A. The radius may be selected so that a set number of content providers are located within (or are associated with) the circular geographic area defined by the radius. The geographic area defined by the determined geographic extent and deemed relevant to a user is referred to herein as the geographic relevance area 206, or relevance area, for a business category. The geographic relevance area 206 may differ depending on the business category or the particular location associated with the search request. The latter is illustrated by comparing FIGS. 2A and 2B.

Figure 2B:
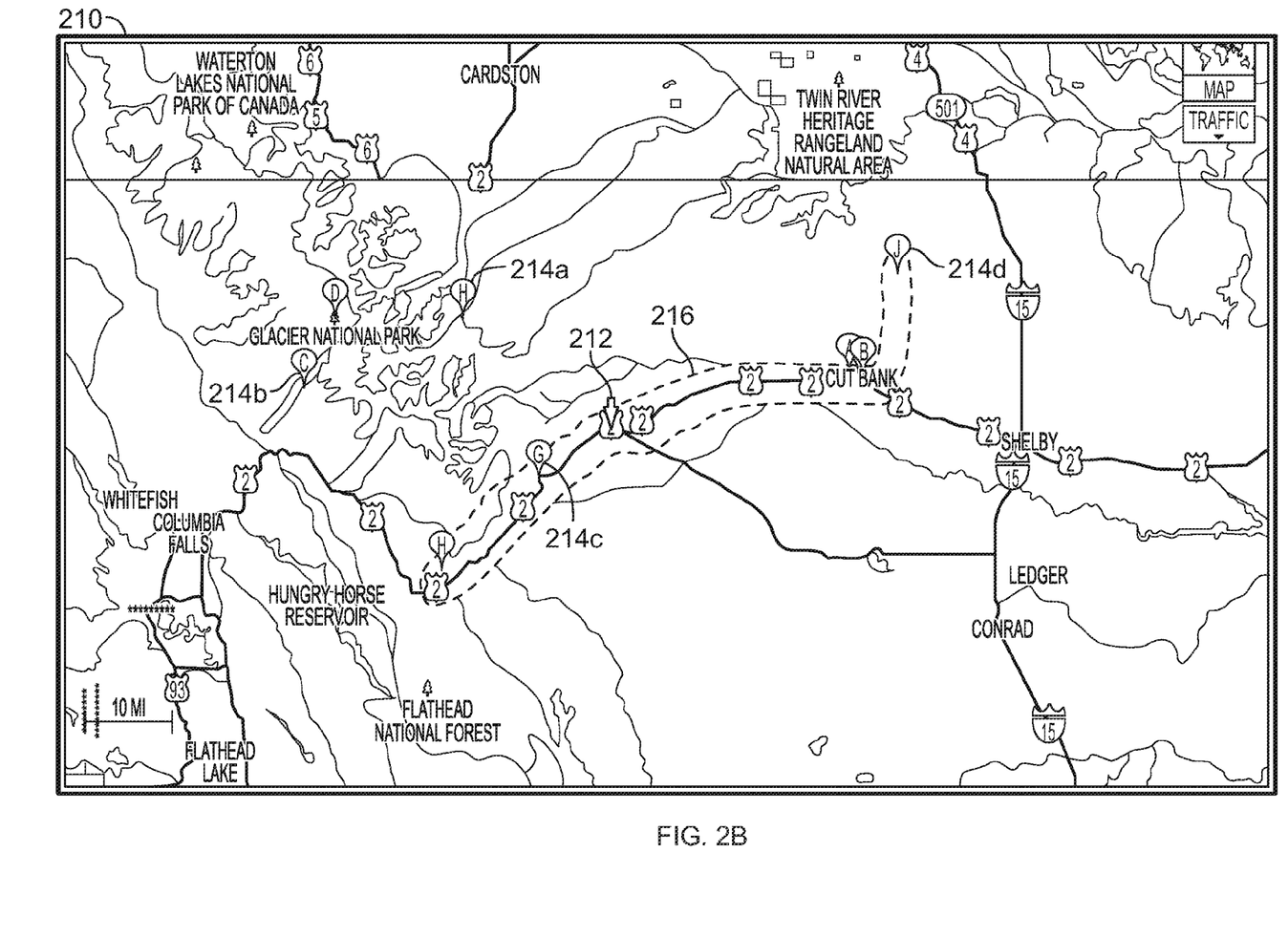
FIG. 2B is an example map showing a geographic relevance area in an area with a low business category density.

The geographic relevance area 206 need not be limited to a circular area, such as, in the example map of FIG. 2B. That is, the extent need not be a uniform radius extending equidistance from a central location. In some implementations, a large map showing the business category density of a particular business category is first provided. The map is then zoomed in to the particular location associated with the search request until only a certain number of content providers are located within the zoomed-in map. The map may be zoomed in a non-geometrically-uniform manner. For example, rather than zooming in by distance to the particular location, the map may be zoomed in by estimated travel time. Such a zooming method would yield a map having an irregular (i.e., not circular or rectangular) shape as dictated by the presence of accessible roadways/paths and traffic.

Alternatively, the method may start with a large map showing the business category density of a particular business category and highlight only the exact location associated with the search request. The highlighted area is then expanded from the location outward to include entities in the vicinity of the location. The expansion, or zooming out, of the highlighted area may occur uniformly, resulting in a highlighted circle that represents the geographic relevance area 206, as in FIG. 2A. In some instances, the expansion, or zooming outward, is non-uniform but instead causes areas including major roads and highways to expand out farther and be included in the highlighted area, while undeveloped or inaccessible areas are not included in the highlighted area. Such a non-uniform expansion may result in an irregularly-shaped geographic relevance area 216, as in FIG. 2B.

In some implementations, the density calculator engine 125 may provide upper and lower thresholds for defining the geographic extent. That is, too large of an extent would likely yield businesses that are located too far away so that a user would not likely be willing to travel to that business location. Therefore, for example, an extent may be defined, such as a geographic limit of 10 miles, so that only businesses/content sponsors located within (or in association with) 10 miles of the particular location are included by the density calculator engine 125. Similarly, if the extent is defined too narrowly—with a very small geographic extent—the results would likely not be meaningful. A minimum number of sponsors is needed to run a meaningful auction for advertisements, for example. Therefore, for example, a threshold number of sponsors (e.g., 5-6 content providers) may be required by the geographic area defined by the geographic extent.

Referring to FIG. 2A, a map 200 showing a geographic relevance area 206 for pizza restaurants around a particular location 202 in Bryant Park is provided. As shown in the map 200, numerous business entities are located within a ten-block radius of the location 202. The density calculator engine may have a lower threshold of eleven entities. Based on this lower threshold of eleven entities and a very high business category density (as illustrated by the numerous markers 204a, 204b, 204c, 204b), the geographic extent of the geographic relevance area 206 is determined. As shown in FIG. 2A, the geographic relevance area 206 for the location 202 relating to "pizza restaurants" is circle defined by about a half-mile radius around the location 202.

As discussed above, the geographic relevance area can be any shape; it is not limited to a circle or rectangular shape. An irregular shape should be understood to be a non-circular or not rectangular shape. In less populated areas, an irregularly-shaped geographic relevance area may be more meaningful because an irregularly-shaped area may better outline areas that are more easily accessed by foot or by car.

Referring to FIG. 2B, a map 210 showing a geographic relevance area 216 for pizza restaurants around a particular location 212 in sparsely-populated Browning, Mont. In contrast to the circular-shaped geographic relevance area 206 of Manhattan (shown in FIG. 2A), the geographic relevance area 216 in FIG. 2B is irregularly-shaped. The shape of the geographic relevance area 216 in FIG. 2B reflects the low population density and the low business category density of pizza restaurants in Browning, Mont. In the example in FIG. 2B, the density calculator engine 125 as determined a geographic extent based on the business category density information for pizza restaurants around Browning, Mont. Because the area around the location 212 is sparsely populated with few pizza restaurants in the immediate vicinity of the location 212, the relevant geographic area 216 spans over 20 miles east and west of the particular location 212.

Notably, the relevant geographic area 216 also extends along the highway rather than uniformly from the particular location 212. By defining the extent this manner, the density calculator engine 125 provides a geographic relevance area 216 that a user located at the location 212 is more likely to be willing to travel because the geographic relevance area 216 outlines major roads and highways that are easily accessed by car. In contrast, if the density calculator engine 125 provided a circular-shaped geographic relevance area as in the example in Manhattan, shown in FIG. 2A, the geographic relevance area would likely contain many geographic locations that a user would be unlikely to travel to, such as undeveloped, or inaccessible locations (e.g., across a river where the closest bridge is 40 miles away but where the business is actually relatively close "as the crow flies"). Thus, a circular-shaped geographic relevance area may be more meaningful for geographic locations that are more densely populated and more easily accessible by car and by foot (i.e., with paved roads/paths). The relatively-small circular-shaped geographic relevance area 206 of FIG. 2A reflects both the high business category density and the walkability of the location 202 in Manhattan.

The content management system 110 further includes a publication engine 126. The publication engine 126 receives the business category density information and extent for the particular location and business category from the density calculator engine 125 and selects one or more content items associated with one or more of businesses/content providers located within (or associated with) the geographic relevance area for the particular business category. In some implementations, the content management system 110 conducts an auction based on eligible content items associated with entities located within (or associated with) the geographic relevance area. In those instances, the content items published by the publication engine are based at least in part on the results of the auction. The publication engine 126 then publishes the one or more content items. The one or more content items may be published along with search results 118 from the search system 112 that are responsive to the user's search query 116.

Figure 3:
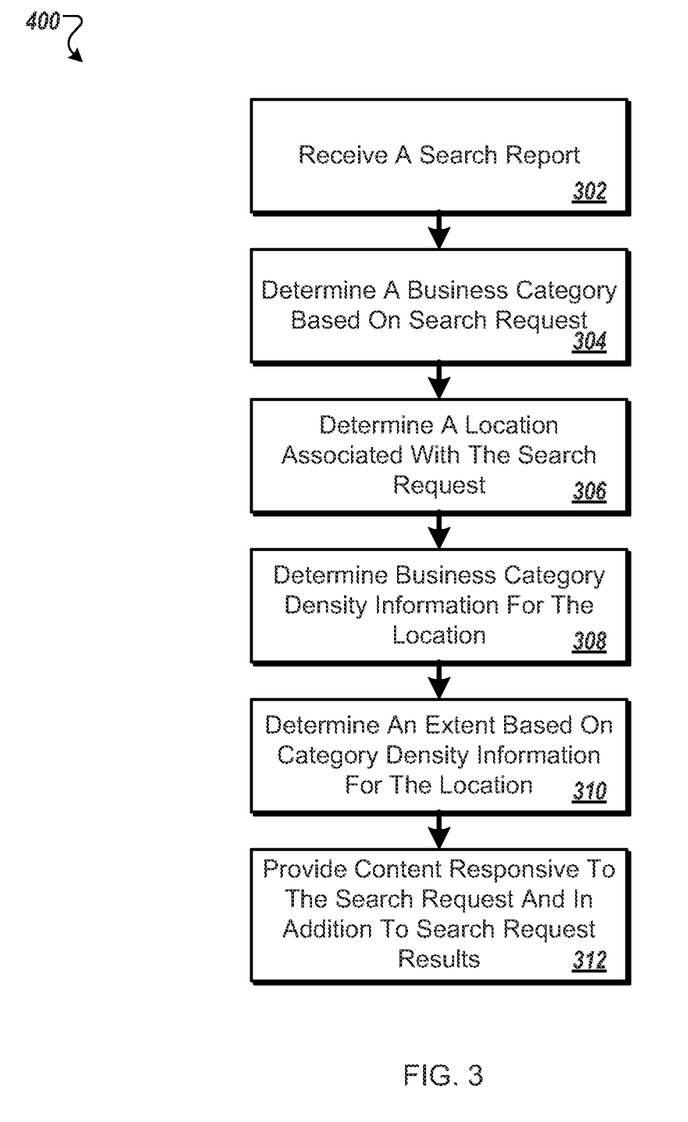
FIG. 3 is a flowchart of an example method for defining relevant content based on business density.

FIG. 3 shows a flowchart of an example method for defining relevant content based on business density. At 302, a search request is received. For example, the content management system 110 may comprise one or more computing devices. As described above with respect to FIG. 1, the content management system 110 may further comprise a number of engines. A request handler 121 in the content management system 110 may be configured to receive the search request over a network 102. In some implementations, the search request is sent from the search system 112 and originates from query 116 from a user device 106.

At 304, a business category is determined based on the search request. For example, a categorization engine 112 in the content management system 110 can analyze the search request to select a business type. For example, if a search request includes the terms "Art Brown International Pen Store," the categorization engine 112 reviews the search request and determines that the business category is "stationery store." This example illustrates that even though the search request is directed to a particular store (Art Brown International Pen Store), a more generalized business category is determined.

At 306, a location associated with the search request is determined. The location may be determined by a location engine 124 in the content management system 110. In some instances, the location is selected from the group comprising an explicit location included in the search request, a location associated with results responsive to the search request, or a location of interest associated with the search request. For instance, a search request may include the terms "Art Brown International Pen Store Midtown." From this search request, the location engine 124 can determine the location to be Midtown Manhattan in New York City. In another example, the search request only includes the terms "Art Brown International Pen Store." However, the location engine 124 may determine that results responsive to the search request indicate that the Art Brown International Pen Store is located in Midtown Manhattan.

At 308, business category density information for the location is determined by, for example, the location engine 124 at 306. In some implementations, the business category density information is determined by generating a map, such as the example maps 200, 210 discussed above and shown in FIGS. 2A and 2B, respectively.

In some implementations, the business category density information is determined by using a global directory of businesses. The global directory of business includes businesses that are characterized as being associated with one or more business categories. The global directory of businesses further includes a location for each of the business in the global directory. Using the location and business category of each business in the global directory of businesses, the density calculator engine 125 can determine business category density information for the location.

At 310, an extent is determined based on category density information for the location. For example, the density calculator engine 125 uses the maps generated at 308 to determine a geographic extent. The density calculator 125 may further use one or more threshold values. For instance, a lower threshold may be defined so that a certain number of content providers are included. The lower the business category density, the larger the geographic relevance area may need to be in order to include the minimum number of content providers as dictated by the lower threshold. Similarly, an upper threshold may also be set. The upper threshold may be set based on the number of content providers included in the geographic relevance area. In some implementations, the upper threshold may be set based on geographic distance. That is, an upper threshold may define a certain geographic distance a user may be willing to travel. Any distance farther than that geographic distance would be deemed too far to travel for a user, so content providers associated with or located farther than the upper threshold geographic distance would not be included in the geographic relevance area.

The upper threshold geographic distance in the example map 200 in FIG. 2A, is likely smaller than the upper threshold geographic distance in the example map 210 in FIG. 2B. This is because a person in Browning, Mont., is more likely to be willing to travel a farther distance for pizza than a person located in Midtown Manhattan. The upper and lower threshold values may be dictated by the particular location associated with the search request. The upper and lower threshold values may be further dictated by the determined business category.

For example, the lower threshold in the example map 200 in Midtown Manhattan in FIG. 2A may be ten, requiring that a geographic relevance area 206 include at least ten content providers related to the search request, "pizza restaurants." However, the lower threshold in the example map 210 in Browning, Mont., shown in FIG. 2B, may be only five, requiring that a geographic relevance area 216 include at least five content providers. The lower threshold in Browning, Mont., reflects the fact that fewer businesses and content providers are located in Browning, Mont.

At 312, content is provided to a user responsive to the request based at least in part on the extent and in addition to search request results.

These and other services may be implemented in a server system. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 4:
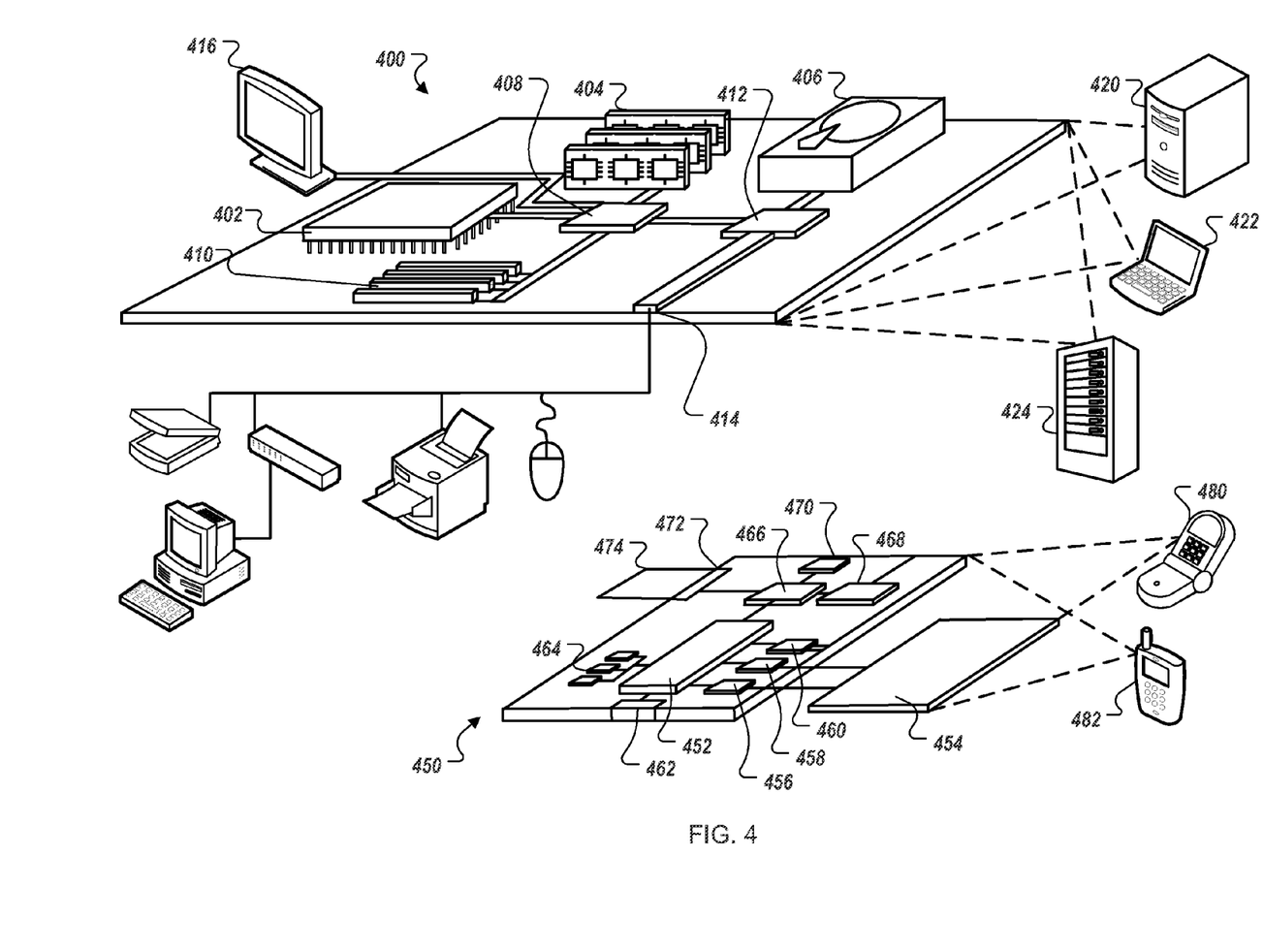
FIG. 4 is a conceptual diagram of a system that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device, such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method comprising:
   receiving, using one or more computing devices, a search request from a user;
   determining, using the one or more computing devices, a first business category based on the search request;
   determining, using the one or more computing devices, a search location associated with the search request, wherein the search location is selected from a he group consisting of one or more of an explicit location included in the search request, a location associated with results responsive to the search request, GPS coordinates for a location, and a location of interest associated with the search request;

determining, using the one or more computing devices, a particular geographic area that is to be used as criteria for selecting content, wherein the particular geographic area defines a shape associated with the search location and wherein the shape is determined based on the search location;

determining, using the one or more computing devices, a number of businesses in the first business category that are located in the particular geographic area that is associated with the search location, wherein determining the number of businesses in the first business category that are located in the particular geographic area is based at least in part on the first business category and the search location associated with the search request;

determining, using the one or more computing devices, that the number of businesses that are in the first business category and that are located in the particular geographic area is a number of multiple businesses that is greater than a predefined threshold; identifying, using the one or more computing devices, a second business category that is a more narrow business category than the first business category in response to determining that the number of businesses that are in the first business category and that are located in the particular geographic area is a number of multiple businesses that is greater than the predefined threshold, wherein the more narrow business category is a business category for which a smaller number of businesses are identified for the search request than for a broader business category, and wherein the broader business category is a business category for which a greater number of businesses are identified for the search request than for the more narrow business category;

determining, using the one or more computing devices, local content to provide to the user based at least in part on the particular geographic area, the second business category, and the search location; and providing for display to the user, using the one or more computing devices, the local content.

2. The method of claim 1, wherein determining the first business category is based on a result associated with the search request.

3. The method of claim 1, wherein the search request includes the first business category or a specific business belonging to the first business category.

4. The method of claim 1, wherein the particular geographic area defines a relevance area that the user would consider as being relevant to the search request.

5. The method of claim 4, wherein the relevance area differs by one or more of business category or region.

6. The method of claim 4, wherein the relevance area is dependent on a population density associated with the location.

7. The method of claim 1, further comprising providing, using the one or more computing devices, a global directory of businesses, each business being characterized as being associated with a respective business category, and wherein determining the first business category includes using the global directory of businesses.

8. The method of claim 7, wherein determining the number of businesses in the first business category comprises querying the global directory of businesses, the method further comprising providing, using the one or more computing devices, a map of business density globally by business category.

9. The method of claim 1, wherein determining the particular geographic area includes
identifying a threshold number of search request results to be returned to the user,
identifying an area that likely will include the threshold number of search request results,
querying a database of business entities to locate entities relating to the first business category that are within the area, and
determining a number of entities relating to the first business category that are within the area.

10. The method of claim 9, wherein, determining the particular geographic area further includes, when the number of entities relating to the first business category that are within the area is greater than the threshold number, modifying the area to increase the number of business entities to be equal to the threshold number.

11. The method of claim 9, wherein, determining the particular geographic area further includes, when the number of entities relating to the first business category that are within the area is less than the threshold number, modifying the area to decrease the number of business entities to be equal to the threshold number.

12. A system comprising:
one or more computer processors; and
one or more non-transitory computer readable devices that include instructions that, when executed by the one or more computer processors, causes the processors to perform operations, the operations comprising:
receiving, using one or more computing devices, a search request from a user;
determining, using the one or more computing devices, a first business category based on the search request;
determining, using the one or more computing devices, a search location associated with the search request, wherein the search location is selected from a group consisting of one or more of an explicit location included in the search request, a location associated with results responsive to the search request, GPS coordinates for a location, and a location of interest associated with the search request;
determining, using the one or more computing devices, a particular geographic area that is to be used as criteria for selecting content, wherein the particular geographic area defines a shape associated with the search location and wherein the shape is determined based on the search location;
determining, using the one or more computing devices, a number of businesses in the first business category that are located in the particular geographic area that is associated with the search location, wherein determining the number of businesses in the first business category that are located in the particular geographic area is based at least in part on the first business category and the search location associated with the search request;
determining, using the one or more computing devices, that the number of businesses that are in the first business category and that are located in the particular geographic area is a number of multiple businesses that is greater than a predefined threshold;
identifying, using the one or more computing devices, a second business category that is a more narrow business category than the first business category in response to determining that the number of businesses that are in the first business category and that are located in the particular geographic area is a number of multiple businesses that is greater than the predefined threshold,
  wherein the more narrow business category is a business category for which a smaller number of businesses are identified for the search request than for a broader business category, and
  wherein the broader business category is a business category for which a greater number of businesses are identified for the search request than for the more narrow business category;
determining, using the one or more computing devices, local content to provide to the user based at least in part on the particular geographic area, the second business category, and the search location; and
providing for display to the user, using the one or more computing devices, the local content.

13. The system of claim 12, wherein determining the first business category is based on a result associated with the search request.

14. The system of claim 12, wherein the particular geographic area defines a relevance area that the user would consider as being relevant to the search request.

15. A method comprising:
receiving from a user, using one or more computing devices, a search request associated with a search location and a first business category;
determining, using the one or more computing devices, a particular geographic area that is to be used as criteria for selecting content, wherein the particular geographic area defines a shape associated with the search location and wherein the shape is determined based on the search location;
determining, using the one or more computing devices, a number of businesses in the first business category that are located in a particular geographic area that is associated with the search location;
determining, using the one or more computing devices, that a number of businesses that are in the first business category and that are located in the particular geographic area is a number of multiple businesses that is greater than a predefined threshold;
identifying, using the one or more computing devices, a second business category that is a more narrow business category than the first business category in response to determining that the number of businesses that are in the first business category and that are located in the particular geographic area is greater than the predefined threshold,
  wherein the more narrow business category is a business category for which a smaller number of businesses are identified for the search request than for a broader business category, and
  wherein the broader business category is a business category for which a greater number of businesses are identified for the search request than for the more narrow business category;
generating a map, using the one or more computing devices, defining a relevance area based on the particular geographic area;
conducting an auction, using the one or more computing devices, for business entities in the second business category located in the relevance area; and
providing, for display to the user, using the one or more computing devices, content to the user responsive to the search request based at least in part on the auction.

16. The method of claim 15, wherein determining the particular geographic area includes
identifying a threshold number of search request results to be returned to the user,
identifying an area that likely will include the threshold number of search request results,
querying a database of business entities to locate entities relating to the first business category that are within the area,
determining a number of entities relating to the first business category that are within the area, and
adjusting the area based on a comparison of the number of entities relating to the first business category that are within the area and the threshold number.

17. The method of claim 15, wherein providing, for display to the user, content to the user responsive to the search request based at least in part on the auction, comprises displaying the content on the map, wherein the map further displays the relevance area.

* * * * *